United States Patent
Pol et al.

(10) Patent No.: US 8,580,222 B2
(45) Date of Patent: Nov. 12, 2013

(54) PROCESS FOR REMEDIATION OF PLASTIC WASTE

(75) Inventors: Vilas G. Pol, Westmont, IL (US); Pappannan Thiyagarajan, Clarksburg, MD (US)

(73) Assignee: Uchicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/422,811

(22) Filed: Mar. 16, 2012

(65) Prior Publication Data

US 2012/0181486 A1 Jul. 19, 2012

Related U.S. Application Data

(63) Continuation-in-part of application No. 12/507,300, filed on Jul. 22, 2009, now Pat. No. 8,153,094.

(60) Provisional application No. 61/135,638, filed on Jul. 22, 2008.

(51) Int. Cl.
*D01F 9/12* (2006.01)
*B01D 53/14* (2006.01)
*B01D 53/56* (2006.01)
*B01D 53/52* (2006.01)
*C01B 17/16* (2006.01)

(52) U.S. Cl.
USPC ............ 423/447.1; 423/447.7; 423/222; 423/220; 423/221; 423/242.1; 977/842; 977/752; 977/846

(58) Field of Classification Search
None
See application file for complete search history.

(56) References Cited

U.S. PATENT DOCUMENTS

| | | | |
|---|---|---|---|
| 6,444,864 B1 * | 9/2002 | Knight et al. | 585/241 |
| 6,998,103 B1 * | 2/2006 | Phillips et al. | 423/447.3 |
| 7,718,152 B2 * | 5/2010 | Stenger et al. | 423/222 |

OTHER PUBLICATIONS

Rao et al.; Carbon Nanotubes by the Metallocene Route; Chemical Physics Letters; 267, pp. 276-280; 1997.*
Arena et al.; Multi-Wall carbon Nanotubes Obtained by Fluidized Bed Pyrolysis of Virgin or Recycled Plastics; 12th International Conferences on Fluidization-New Horizons in Fluidization Engineer; 2007.*
Meier; Fluidized Bed Reactor Catalytic Olefin Polymerization; 2000.*

* cited by examiner

*Primary Examiner* — Guinever Gregorio
(74) *Attorney, Agent, or Firm* — Cherskov Flaynik & Gurda, LLC

(57) ABSTRACT

A single step process for degrading plastic waste by converting the plastic waste into carbonaceous products via thermal decomposition of the plastic waste by placing the plastic waste into a reactor, heating the plastic waste under an inert or air atmosphere until the temperature of about 700° C. is achieved, allowing the reactor to cool down, and recovering the resulting decomposition products therefrom. The decomposition products that this process yields are carbonaceous materials, and more specifically carbon nanotubes having a partially filled core (encapsulated) adjacent to one end of the nanotube. Additionally, in the presence of a transition metal compound, this thermal decomposition process produces multi-walled carbon nanotubes.

24 Claims, 17 Drawing Sheets

PROCESS FOR REMEDIATION OF PLASTIC WASTE

PRIORITY DATA

This Utility Patent Application claims the benefit as a Continuation-in-Part of U.S. patent application Ser. No. 12/507,300, filed on Jul. 22, 2009, currently pending, which in turn claims priority benefit of U.S. Provisional Patent Application No. 61/135,638 filed Jul. 22, 2008, currently expired.

CONTRACTUAL ORIGIN OF INVENTION

The U.S. Government has rights in this invention pursuant to Contract No. DE-AC02-06CH11357 between the U.S. Department of Energy and the UChicago Argonne, LLC, representing Argonne National Laboratory.

BACKGROUND OF THE INVENTION

1. Field of the Invention

This invention relates to a process for the remediation of plastic waste, and more specifically, this invention relates to a process for the remediation of plastic waste, such as polyethylene and polystyrene, by converting the plastic waste to carbonaceous materials using a single step thermal decomposition process.

2. Background of the Invention

Polyethylene-based automobile parts, food packaging materials, toys, and milk bottles, as well as polystyrene-based plates, cups and packaging materials comprise much of the energy and environmental burdens associated with plastic. The United States alone consumes approximately 100 billion plastic grocery bags every year. Given that a single grocery bag requires approximately 0.48 mega joules of energy to be produced (the equivalent of the amount of energy consumed by the average passenger car traveling ⅛ of a Kilometer), the production of 100 billion plastic grocery bags equals 7.75 billion miles of automobile travel, which at 30 miles per gallon average efficiency, equals 258 million gallons of gasoline.

Various methods are used to dispose of solid waste material, such as recycling and the use of landfills. Recycling is strongly encouraged by many communities, but only a small amount of the total solid waste is actually recycled. Using landfills to store plastic waste is not an effective solution as plastics are not biodegradable.

While specific recycling facilities for plastic waste exist across the globe, the success of these facilities and the technology they utilize is limited as burning of plastic releases toxic fumes into the atmosphere. Also, mixing chemically different polymers will not yield homogenous materials to make new products from the recycled waste. Current processes for the sorting of similar types of plastic waste are labor intensive and thus not cost effective.

Ideally, the recycling of plastic waste would result in the formation of usable carbonaceous product. Carbon black is one of the largest commodities of carbonaceous product with millions of tons being produced each year. Carbon black, commonly referred to as "soot", is produced commercially by the partial combustion of petroleum. Carbon powder can take a number of forms from the most common form being amorphous graphite, some spherical particles, irregular shaped graphite, and fullerenes. There are different grades of carbon black (based on size) available. Applications for the use of carbon black tend to be for lubrication, tire and paint coloring, food coloring, and abrasives. The recent increases in oil prices have lead to increases in the price of carbon black.

Carbon nanotubes can be made by a variety of methods including laser ablation and electric arc discharge, but chemical (and plasma) vapor deposition is the method used to produce commercial qualities. On average, the cost of producing nanotubes is high, with a small number of manufacturers present in the market of producing such nanotubes. There is a lot of research on applications of the use of nanotubes. These applications vary from hydrogen storage, to composites, to semiconductors, but no specific application has seemed to reach popular commercial use, as noted by the low production and high pricing of nanotubes.

Accordingly, a need exists in the art for a method of recycling the massive amount of plastic waste that is produced. The method would convert the plastic waste into a carbonaceous byproduct that is economically advantageous, useful to manufacturers, and not harmful to the environment. The method would also require less energy than typical recycling methods.

SUMMARY OF INVENTION

An object of the present invention is to provide a method for transforming plastic waste that overcomes many of the drawbacks of the prior art.

Another object of the present invention is to provide a method of transforming high and low density polyethylene and polystyrene waste into carbonaceous products. A feature of the invention is the thermal decomposition of polymer waste at a temperature as low as 650° C., and preferably at 700° C., without the use of catalysts. An advantage of this invention is that it enables economical production of industrially significant and highly reproducible carbonaceous products through a high yielding high efficiency process.

Still another object of the present invention is to provide a method of transferring high and low density polyethylene and polystyrene waste into useful carbon-based particles. A feature of the invention is the production of carbon spheres, ellipsoids, and tubes having multi-walled configurations and which range in size from 2 micrometers to 12 micrometers. An advantage of this invention is that the carbon-based particles exhibit superior lubricity and electrical conductivity.

Yet another object of the present invention is to provide a method of degrading high and low density polyethylene and polystyrene waste. A feature of the invention is that the method comprises a single step utilizing autogenic pressure such that pressure created during the plastic degradation is not removed from the reaction chamber. No fluid communication of any kind exits between the reactor chamber and the ambient environment during thermal degradation. An advantage of this invention is that it facilitates the minimization of mixed plastic waste without the need for time-consuming and labor intensive sorting.

Still another object of the present invention is to provide a method of transferring high and low density polyethylene and polystyrene waste into useful carbon-based nanotubes having improved conductivity. A feature of the invention is the production of carbon tubes with a metallic catalyst to impart conductivity to the reprocessed polymer. An advantage of this invention considering Fe—CNTs as additives for improving the conductivity of non-conducting polymers.

Yet another object of the present invention is to provide a method of changing high and low density polyethylene and polystyrene waste into useful carbon-based particles using an inexpensive catalyst having minimally harmful environmental impact. A feature of the invention is the production of carbon spheres, ellipsoids, and tubes having multi-walled configurations with an iron-base catalyst having minimal negative environmental impact. An advantage of this invention is that the carbon-based particles are formed with the use of an iron-base inexpensive catalyst having limited environmental impact.

Briefly, the invention provides an isochoric process of transforming polymer forms into carbonaceous particles, comprising heating the forms in an environment which is adapted to contain any increase in pressure during the process; maintaining the forms at a temperature and for a time sufficient to cause substantially all C—H and C—C bonds in the forms to break; and cooling the environment.

Also provided is a process for producing carbonaceous particles, the process comprising placing polymer forms in an isochoric environment adapted to contain any increase in pressure produced inside the environment; heating the forms in the environment; maintaining the environment at a temperature and for a time sufficient to cause substantially all C—H and C—C bonds in the forms to break; and cooling the environment.

BRIEF DESCRIPTION OF DRAWING

The invention together with the above and other objects and advantages will be best understood from the following detailed description of the preferred embodiment of the invention shown in the accompanying drawing, wherein.

DETAILED DESCRIPTION OF THE INVENTION

Figure 1:
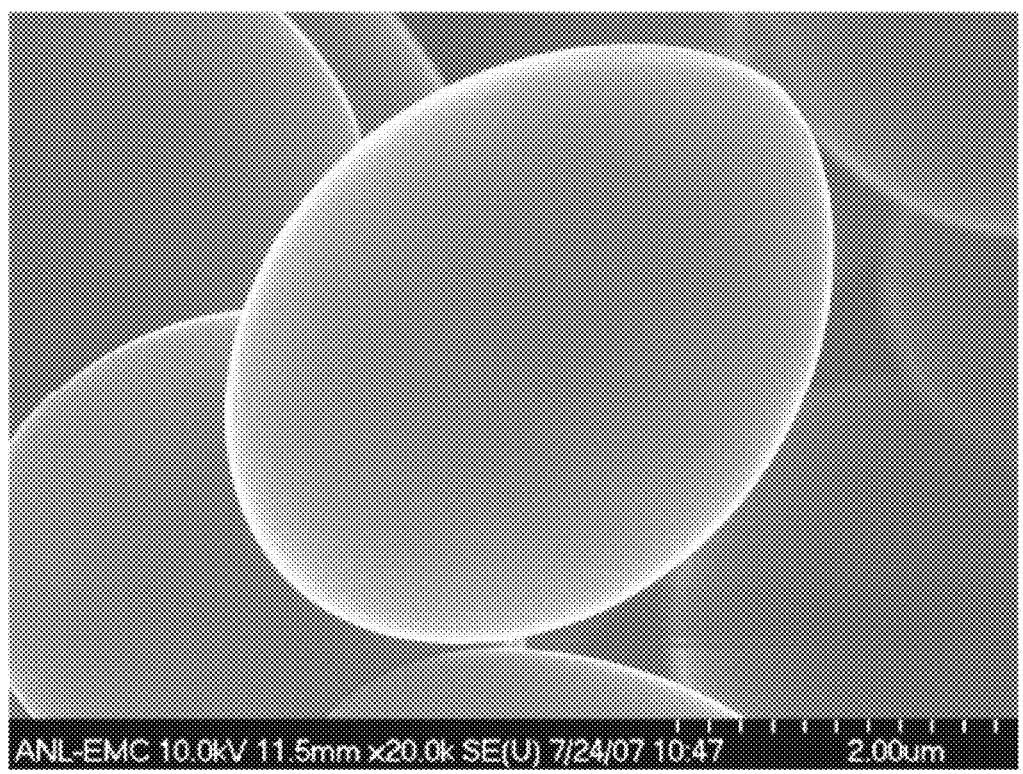
FIG. 1 is an image of the egg-shaped solid carbon particles produced by the invented system, in accordance with features of the present invention.

The invention comprises the decomposition of plastic waste, such as polyethylene and polystyrene in an enclosed chamber to produce carbonaceous product. The reaction conditions include subjecting the plastic feedstock to a temperature sufficient to break the carbon-carbon and carbon-hydrogen bonds of the feedstock while utilizing pressure increases occurring as a result of the thermal treatment of the feedstock. Also, none of the aforementioned autogenic (i.e. self generated) pressure is released during the process. Rather, the process is a closed process such that the pressure is contained within the reaction atmosphere of the fixed volume reactor. This applied pressure, which simultaneously forms with thermal conversion of the feedstock, facilitates the breakage of the carbon-carbon and carbon-hydrogen bonds. The pressures developed during the process of the invention may reach from about 400 psi to about 2000 psi.

An embodiment of the invention. In which carbon spheres are produced, is catalyst free, such that no initiator or reaction promoter, such as metal, solvent, or other catalyst, is added to the plastic feedstock. Rather, the feedstock in its original waste-form, which may include metal remnants, is utilized without pretreatment.

Another embodiment of the invention, in which tubes are produced, utilizes transition metals in the reaction mix. The transition metal serves as a nucleation point from which graphite sheets encircle and extend to form concentrically arranged nanotubes. The ends of the tubes proximal to the transition metal particle are closed while the ends of the tubes distal from the metal particle remain open.

Another embodiment of the invention, in which tubes are produced, uses an environmental compatible catalyst, ferrocene, to form nanotubes. The product carbon nanotubes in one embodiment have a bamboo-shaped structure providing improved conductivity. The ends of the tubes proximal to the iron-based metal particle are closed while the ends of the tubes distal from the metal particle remain open.

The invented process is scalable for the production of superconducting materials ($MgB_2$, $MgCNi_3$), high surface area (SiC, $WS_2$) nanomaterials for hydrogen storage, anode ($V_2O_5C$, SnS) nanopowders for Li ion batteries, hard (WC) carbide nanotubes, and other potentially important materials. One of the main benefits of this invention is that it allows for the continued use of plastics for consumer goods by enabling conversion of polymer waste into industrially significant value-added products that are environmentally friendly.

An embodiment of the invention is a single-step process to transform high and low density polyethylene and polystyrene forms into useful carbonaceous products. The plastic forms do not have to be separated according to polymer classifications. Rather, an embodiment of the invented process enables mixed batch pyrolysis. It is also noted that no further processing of the polymer waste is required before the waste is introduced into the reactor because the invented process leads to approximately a 60-80 percent thermal dissociation of the waste and the forming of carbonaceous products.

Additionally, in order to produce the carbonaceous materials, the waste can be in any type of form (solid, liquid, etc.) and it can be tainted with polar or non-polar fluids, so long as the waste and the tainting fluids are composed of hydrocarbons, carbon, hydrogen, or oxygen. The presence of foreign materials into the reactor, such as debris, sand, and metals, may lead to some impurities in the carbonaceous materials, such that different end users of the product will specify feedstock quality, depending on end use requirements. The presence of bulk metals that have high melting and boiling points will not directly impact the growth of carbon nanotubes. The presence of oxides and particular metals, such as iron, nickel, and cobalt, along with the waste, will lead to the formation of morphologically different products with random shapes.

One product of particular importance is the formation of metal tipped multi-walled carbon nanotubes. Due to the incorporation of conductive metallic element within the molecular structure of the carbon nanotube, the overall thermal and electrical conductance of the carbon nanotube is increased. The conductive carbon nanotube can then be blended into a bulk polymer to increase the bulk thermal and electrical conductivity of the polymer or rubber system. For example, the addition of from 1 to 5 weight percent of carbon nanotube blended into a bulk polymer or rubber matrix can increase the overall thermal and electrical conductivity of the system. In coatings and plastic materials, CNTs impart electrostatic dissipation properties which are invaluable in industry, car manufactures, and electronics.

The multiwalled carbon nanotubes (MWCNTs) can also be introduced into ceramic matrices to develop ultra-high strength and/or multifunctional composites. Recently, CNTs were introduced into refractories to improve their mechanical properties and thermal conductivity, such as $Al_2O_3$—C refractories for slide gates and carbon blocks for blast furnaces in iron and steel making industry (Carbon Nanotubes Applications on Electron Devices, Edited by Jose Mauricio Marulanda, Chapter 15, Pages 351-366, 2011.)

Multi-walled CNTs may also be useful in sports articles such as tennis rackets, baseball bats, bicycle frames, skis and surfboards. They are added to composites to significantly enhance their mechanical performances, and hence help reduce the weight of structures (Available on line from Graphistrength.com)

Depending on the reaction atmosphere, a variety of products are generated, including, but not limited to, spheres, multi-walled tubes, ellipsoid structures, and dumbbell-shaped structures. Conversion percentages, the yield, of raw feedstock to final carbonaceous product range from about 40-60 percent. If the reaction atmosphere is air; the achieved product is about 40%. If the atmosphere is argon or nitrogen, then the formation of $CO_2$ is negligible such that yields up to about 60% product are realized.

Reaction Atmosphere Detail

The reproducible, affordable, scalable, and environmentally friendly process involves thermal decomposition of polymer waste starting at 600° C. and ending at 700° C. Preferably the reaction is maintained at temperatures to break the carbon-carbon, carbon-hydrogen, and carbon-oxygen bonds embodied by the plastic forms. Typically, that temperature is about 700° C. In one embodiment of the process, the reaction occurs in a closed reactor, i.e., one hermetically sealed and therefore isolated from the ambient environment and providing a fixed volume for the reaction. The atmosphere of the reaction is inert; therefore atmospheres substantially comprising nitrogen, helium, neon, argon, or other low oxidizing, low reducing moieties are suitable. Preferably, the reaction chamber is initially swept or permeated at ambient pressure with inert gas. Ambient pressure is defined as the atmospheric pressure outside the reaction chamber. The atmospheric pressure will vary depending on elevation, such that the standard pressure of 29.92' Hg will not always exist. Suitable pressures of inert gas are from 20 to 30 inches of Hg.

The amount of product of the process is inversely proportional to the amount of oxygen in the reactor. This feature actually encourages filling the reactor space to maximum capacity to thereby minimize the amount of oxygen contained in the reactor space. In this scenario, when the reactor is filled to its capacity with polymer waste, between 30 to 40 percent of the volume of the reactor will comprise air. Hence, the volume percent of oxygen in the reactor will be between 6 and 8 percent.

After a time (empirically determined) of thermal conversion, the system is allowed to cool, either naturally or via shock cooling. Natural cooling involves keeping the reaction chamber inside the furnace. Shock cooling involves removing the reaction chamber from the furnace. When natural cooling is utilized, the reactor space takes approximately three hours to reach ambient temperature, with the pressure in the reactor space being reduced to approximately 20 to 30 psi (two atmospheres, maximum) during the cooling down period. When shock cooling is utilized, the reactor space cools in approximately 20 minutes.

The process is solvent free (water or organic) in that it does not require either polar or nonpolar fluids to work.

Carbonaceous Product Detail

The carbonaceous products that result from this process have been characterized using various scattering and imaging techniques to elucidate their composition, morphology and atomic structure.

In the absence of catalysts, process yields micrometer size egg-shaped or spherical solid carbons. The diameters of the spherical solid carbons range from 2 to 10 micrometers, and the aspect ratio of the egg-shaped solid carbons is approximately 1:4. FIG. 1 is a photomicrograph of the produced carbon particles.

Figure 2:
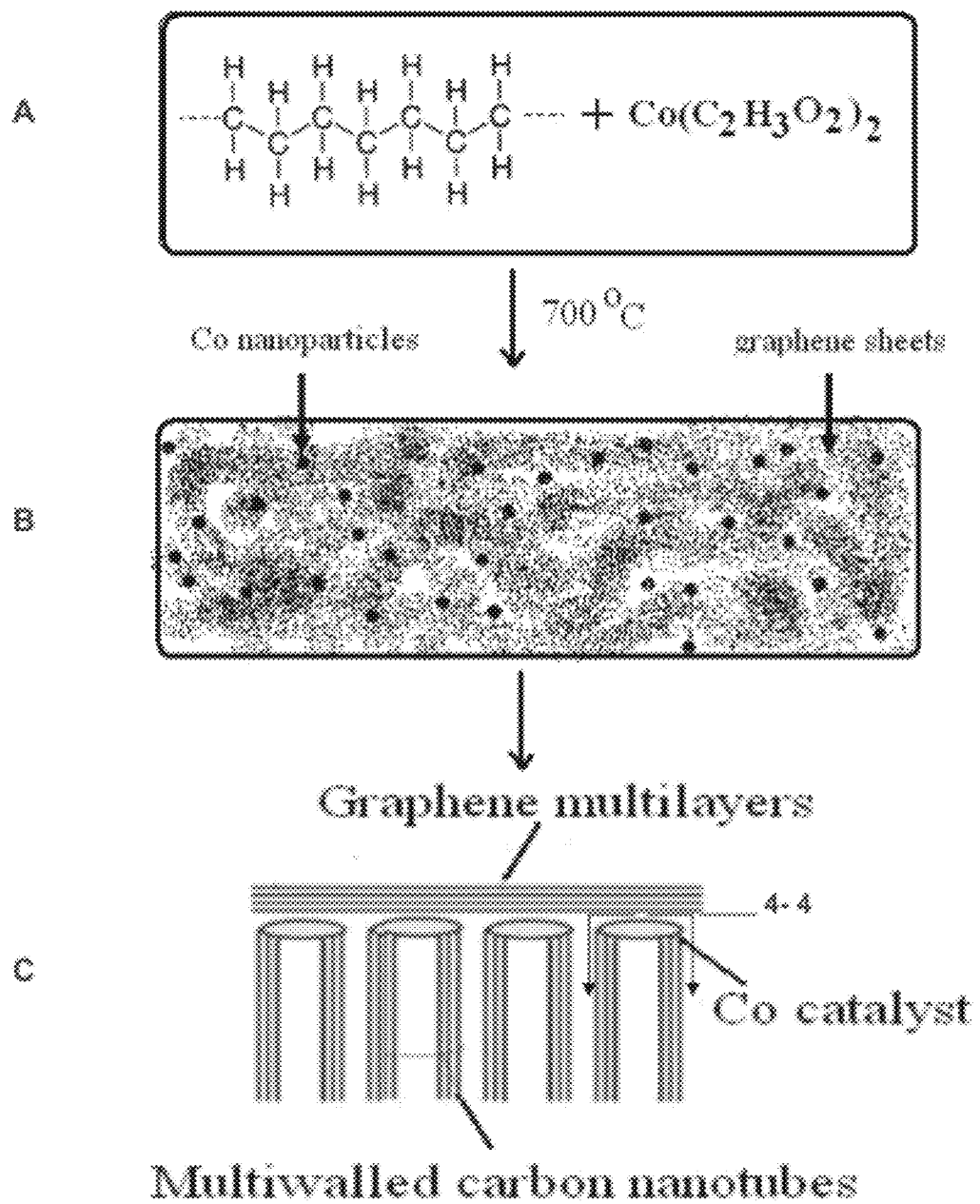
FIG. 2 is a schematic diagram of multi-walled carbon nanotubes produced by the invented system, in accordance with features of the present invention.

In the presence of catalysts, the invented thermal decomposition process produces multi-walled carbon nanotubes. FIGS. 2A-2C provides a sequence of events in an embodiment of the invented process when metal catalyst is utilized. FIG. 2A depicts the beginning of the reaction sequence whence the reactor is first loaded, prior to thermal treatment.

FIG. 2B depicts the formation of nanoparticles and graphene sheets.

Figure 4:
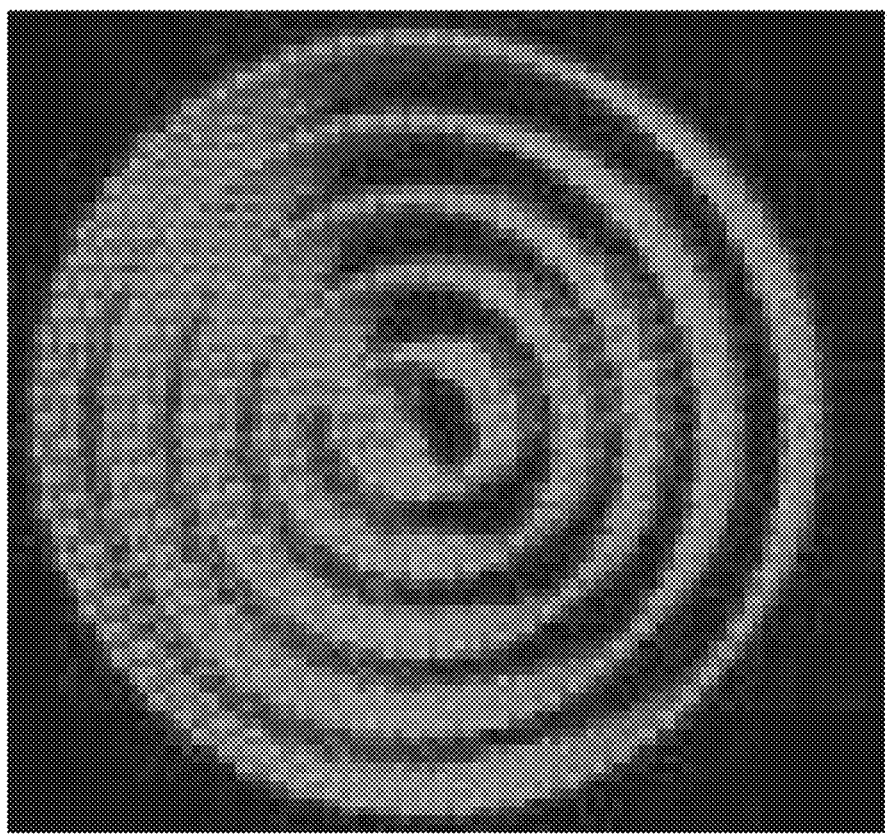
FIG. 4 is a cross section of tubular-shaped carbon particles, as taken along line 4-4 of FIG. 2C, in accordance with features of the present invention.

FIG. 2C depicts the formation of the multi-walled carbon nanotubes, wherein the tubes terminate at one end with a metal tip. The walls of each tube are concentrically arranged such that the tube actually comprises a plurality of concentrically-arranged tubes, extending along the longitudinal axis of the primary tube. FIG. 4 provides a view of FIG. 2C along line 4-4, and shows such concentric arrangement.

The carbonaceous products that result from this single-step batch process are attributable to the autogenic pressure established during the thermal degradation of plastic waste at elevated temperatures. As the pressures achieved within the sealed reaction vessel may reach from about 1000 psia to about 1200 psia, unique reactions taking place on the feedstock may significantly modify the structure and shape of the feed material. When the reactor space is allowed to be cooled and brought down to ambient temperature, the pressure in the reactor space subsides to a few atmospheres. The solid carbonaceous product that results from this process ultimately settles, as a powder form, at the bottom of the reactor due to gravity. This provides convenient collection for the end user for further processing and other applications.

Figure 3:
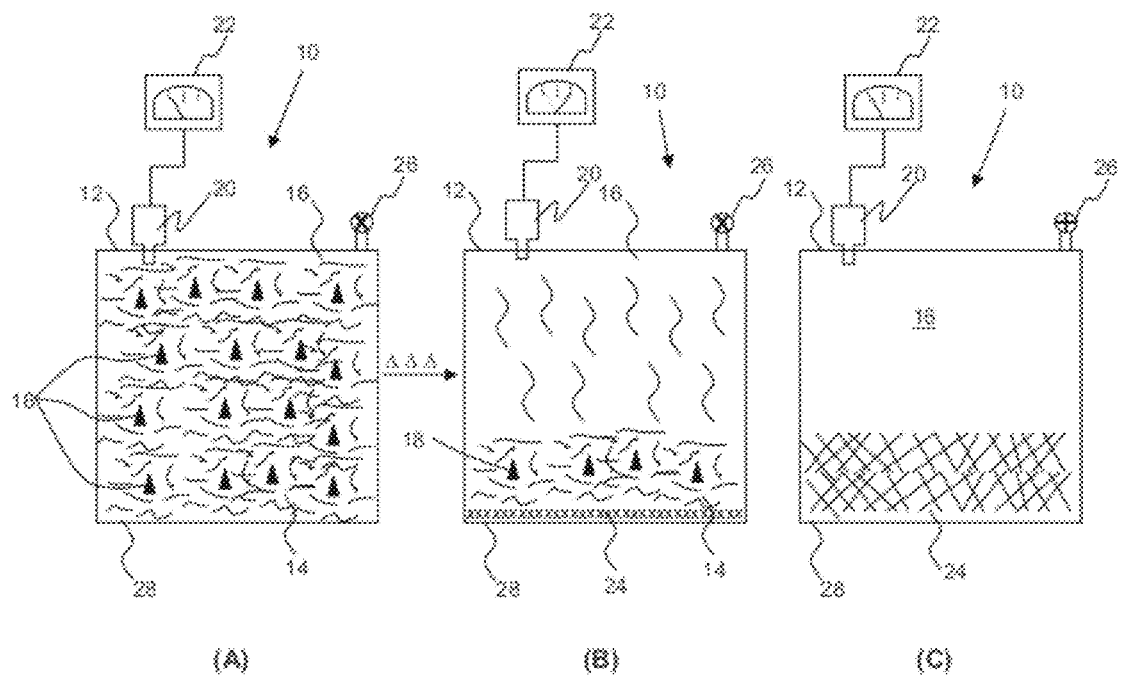
FIGS. 3A-3C are schematic diagrams of a plastic waste remediation system, prior to, during, and after thermal treatment, in accordance with features of the present invention.

An embodiment of the process involves thermal decomposition of polymer waste at a temperature between 600° C. and 700° C. in a sealed stainless steel reactor under an inert or air atmosphere. FIG. 3 is a schematic diagram of a system embodying the process.

As depicted in FIG. 3A, the system 10 comprises a reactor 12 substantially completely filled with mixed plastic material 14. Little or no head space 16 within the reactor is afforded at this juncture so as to minimize oxygen levels in the reactor.

In instances where specific morphology carbonaceous product is desired, metal catalyst 18 is also present in the reactor. The catalyst is shown homogeneously mixed as a solid phase throughout the bulk material 14. In one embodiment of the process, the minimum weight percent of metal alkoxide catalyst to bulk material is approximately 15 weight percent, as elaborated in Table 2, infra. Alternatively, the catalyst can be a large monolith form, or confined to one or a plurality of surfaces within the reactor 12.

A pressure transducer 20 or some other means for monitoring the pressure of the reactor is provided, such that the pressure monitoring means is in fluid communication with the confines of the reactor 12. The transducer 20 is also in electrical communication with a means for displaying the pressure of the reactor atmosphere, one such means 22 being a digital or analog display.

FIG. 3B depicts the system 10 whence heat is applied. Thermal degradation of the waste begins to occur at 600° C., at which point pressure values of the interior of the reactor 12 approach 15 to 50 psi. Formation of carbonaceous product 24 begins. A pressure regulatory means 26 is provided in instances of runaway pressure build-ups. However, such means are typically employed at the end of the process (FIG. 3C) and after substantially complete transformation of the waste occur. Vapor contained in the headspace of the reactor at the end of the process comprises mainly carbon dioxide, hydrogen, and hydrocarbons. Generally, product 24 of the process is solid carbonaceous powder, with no liquid phase present.

After the specified time period has elapsed, the reactor should be given a cool down period. The present form of the process involves natural cooling by air for approximately 2 to 3 hours. This natural cooling enables energy savings by eliminating the use of an external cooling source.

The pressure remains autogenic within the reactor during the process, which means that there is no pressure release from the reactor atmosphere during the process. As the reaction vessel is sealed, in one embodiment of the invention, all of the pressure generated by the process applied to the unique reaction. In one embodiment, pressure is released from the reactor after heating is stopped. In another embodiment, pressure is not released from the reactor until the atmosphere within the reactor is allowed to cool to ambient temperatures. Unlike a flow process, wherein fluids permit dissipation of the pressure, the sealed vessel contains all of the generated pressures within the fixed volume of the reactor.

The high pressure within the reactor provides a means for substantially reducing the temperature at which the growth of carbon nanotubes is initiated. Otherwise, at ambient pressures, temperatures as high as 900° C. would be required, compared to the 600-700° C. utilized in the autogenic pressure process. The high pressure feature of the invented method also causes the assembly of carbon into spheres having higher strength.

When the process is complete, the carbonaceous products 24 that result are in powder form and accumulate at the bottom 28 of the reactor (i.e. via gravitational force). This provides a means for convenient collection for the end user for further processing and other applications. When compared to the volume of polymer waste that is initially introduced into the system, the volume reduction that results from the invented process is 40 to 50%.

The following example is simply to illustrate the effectiveness of the new process. While solid phase feedstock is utilized in the example, liquid phase feed stock (which are hydrocarbons) will also yield carbonaceous product.

EXAMPLE

One experimental remediation setup for small scale decomposition reactions was carried out using a Swaglock 316 SS chamber stainless steel reactor with a volume of 2.5 cm$^3$. The reactor was filled with 0.5 g of polymer waste which yielded 0.2 g of carbonaceous product (carbon ash). A second experimental remediation setup was carried out using a Swaglock chamber reactor with a volume of 5 cm$^3$ that decomposed 1.0 g of polymer waste to produce 0.4 g of carbonaceous products (carbon ash). Multiple runs using each experimental setup were executed in an inert atmosphere and a standard air atmosphere, with the air atmosphere setup typically yielded 10 to 15 percent fewer egg-shaped and spherical solid carbons than the inert atmosphere setup. Conversion percents of feedstock to product ranged from 30 to 55 percent, with 40 percent being the typical percentage. Solid carbon particles with egg-shapes and sphere shapes that had between 2 to 12 micrometer ($10^{-6}$ m) outer diameters were obtained.

Several runs using the setups described above were executed. The polymer feedstock used in these runs included polystyrenes, low density polyethylene (LDPE) and high density polyethylene (HDPE) bags, separately as well as mixed together. For illustrative purposes, other specific plastics were converted via the invented method, including, but not limited to polyethylene terephthalate, polyvinyl pyridine, polystyrene-polyvinyl pyridine (PS-PVP) and combinations thereof.

The runs were executed at about 700° C. as a function of reaction time in the range of 0 to 30 minutes. The heating rates of the reactions that took place were 30° C./minute. The results from these reactions are reproduced in Table 1 below. These results show that complete thermal decomposition of polymer waste in a closed system occurs as soon as the temperature within the stainless steel reactor reaches 700° C. These results also show that the invented process yields carbon spheres with identical morphology (between 2 and 12 micrometers in diameter) and structures.

TABLE 1

Effect of reaction time (700° C., 1.0 g of Waste in 5 cm³ volume reactor)

| Polymer Waste Type | Time (min) | Morphology | Structure |
|---|---|---|---|
| HDPE | 30 | Carbon Spheres | Graphitic |
| HDPE | 20 | Carbon Spheres | Graphitic |
| HDPE | 10 | Carbon Spheres | Graphitic |
| HDPE | 0 | Carbon Spheres | Graphitic |
| LDPE | 30 | Carbon Eggs | Semi-graphitic |
| LDPE | 20 | Carbon Eggs | Semi-graphitic |
| LDPE | 10 | Carbon Eggs | Semi-graphitic |
| LDPE | 0 | Carbon Eggs | Semi-graphitic |
| LDPE + HDPE | 0 | Mostly Carbon Spheres | Semi-graphitic |

Other runs were executed with the presence of metal compounds (catalysts), such as cobalt acetate, nickel acetate, iron acetate, iron ferrite, cobalt ferrite, and combinations thereof. Generally, transition metal-containing particles sized between about 1000 nm and 2000 nm are preferred. Most preferably, cobalt-containing particles are used to catalyze the formation of nanotubes.

These metal catalysis experiments yielded carbon nanotubes, as opposed to the solid carbons with egg and sphere shapes that were produced in runs without the presence of a transition metal compound. See Table 2 below. The length of the tubes varied from 2 micrometers to 20 micrometers. Their diameters varied from 0.04 micrometers to 0.06 micrometers.

The effects of various types and amounts of catalysts on the formation and yield of carbon nanotubes upon the pyrolysis of polymer waste and the results for a reaction time of about 30 minutes are reproduced in Table 2 below. These results show that an increase in the concentration of catalysts cause a concomitant increase in the yield of the tubes. Generally, catalyst weight percents of from 5 to 40 are suitable. Weight percents of from 15 to 30 are preferable.

The results also show that the presence of a catalyst in the reactor causes the formation of carbon particles along with the tubes. Specifically, the results show that acetates of Ni, Co, and Fe are more effective in the production of carbon nanotubes than either the nanoparticles of Ni, Co, Fe, or their oxides. This is due to the fact that at 700° C., acetates of Ni, Co, and Fe produce highly reactive hot nanometallic surfaces, which allow for the growth of dissociated carbons around the surfaces. However, pre-synthesized bare nanometallic particles appear to be less reactive due to their high melting and boiling points. The results also show that HDPE feedstock yields highly graphitic tubes. Conversely, LDPE feedstock yields semi-graphitic tubes, these semi-graphitic tubes being a mixture of ordered and disordered carbon nanotubes. For example, when LDPE is mixed with about 20 weight percent cobalt acetate, and subjected to about 650-700 C temperatures for approximately 2.5 to 3 hours, a 42 percent conversion of the LDPE is realized, with most of the product being carbon nanotubes.

TABLE 2

| Composition | Temp. (° C.) | Yield (%) | Morphology |
|---|---|---|---|
| HDPE + 15 wt % Ni(Ac)$_2$ | 700 | 30 | Short CNT + Particles |
| HDPE + 30 wt % Ni(Ac)$_2$ | 700 | 40 | Short CNT + Particles |
| HDPE + 15 wt. % Co(Ac)$_2$ | 700 | 25 | Short CNT + Particles |
| HDPE + 30 wt. % Co(Ac)$_2$ | 700 | 30 | Short CNT + Particles |
| HDPE + 15 wt. % Fe(Ac)$_2$ | 700 | 25 | Short CNT + Particles |
| HDPE + 30 wt. % Fe(Ac)$_2$ | 700 | 30 | Short CNT + Particles |
| HDPE + 15 wt % Ni(Ac)$_2$ | 800 | 50 | Long CNT + Particles |
| HDPE + 15 wt. % Co(Ac)$_2$ | 800 | 45 | Short CNT + Particles |
| HDPE + 15 wt. % Fe(Ac)$_2$ | 800 | 50 | Short CNT + Particles |
| HDPE + NiFe$_2$O$_4$ Nanoparticles | 700 | | Particles |
| HDPE + Co$_3$O$_4$ Nanoparticles | 700 | | Particles |
| HDPE + Ni Nanoparticles | 700 | | Particles |
| HDPE + Fe Nanoparticles | 700 | | Particles |
| HDPE + Fe$_3$O$_4$ Nanoparticles | 700 | | Particles |
| 85% LDPE + 15% Fe(C$_5$H$_5$)$_2$ | 700 | 45 | Fe Tipped CNT |
| 80% LDPE + 20% Fe(C$_5$H$_5$)$_2$ | 700 | 45 | Fe Tipped CNT |

In all of the experimental remediation setups described above, the chambers were filled with approximately 50% polymer waste. Surprisingly and unexpectedly, experiments showed that when the polymer waste is composed solely of HDPE, the invented process tends to yield graphite carbon spheres, of which approximately 90% have the same sized outer diameter. Alternatively, when the waste is composed of LDPE, the invented process tends to yield amorphorous, semi-graphite carbon eggs. Additionally, when a catalyst, such as cobalt acetate, is introduced into the reactor along with the polymer waste, the invented process tends to yield carbon nanotubes. (See FIGS. 4 and 5.) The summary of the experimental results are reproduced in Table 3 below. These results show that the quality, size, and shape of the resulting carbonaceous products are due to the thermal decomposition of polymer waste under autogenic pressure generated during the reaction.

TABLE 3

Summary of Experimental Results

| Process - Result | Sphere | Eggs | Nanotubes #1 | Nanotubes #2 |
|---|---|---|---|---|
| Raw plastic used | LDPE | HDPE | LDPE + Co acetate | HDPE + Co acetate |
| Furnace Temperature | 700° C. | 700° C. | 700° C. | 700° C. |
| Time at Temperature | 30 minutes | 30 minutes | 30 minutes | 30 minutes |
| Furnace atmosphere | air | air | Nitrogen | Nitrogen |
| Metals used (if any) | | | | |

TABLE 3-continued

Summary of Experimental Results

| Process - Result | Sphere | Eggs | Nanotubes #1 | Nanotubes #2 |
|---|---|---|---|---|
| Carbon form (hollow/solid) | Solid carbon | Solid carbon | Hollow carbon tubes | Hollow carbon tubes |
| Carbon form (graphite/diamond/etc.) | Semi-graphitic | Graphitic | Semi-graphitic | Graphitic |
| Outer diameter | 2 to 12 microns | 2 to 12 microns | 50-100 nanometers | 50-100 nanometers |
| Length (range) | Not applicable | Not applicable | >1 micron | >1 micron |
| Purity (% of particles in the range) | 99.99% | 99.99% | | |
| Comments #1 | EDX analysis detected only the presence of carbon | EDX analysis detected only the presence of carbon | Co nanoparticles are encapsulated at the tip of the nanotubes | Co nanoparticles are encapsulated at the tip of the nanotubes |
| Comments #2 | Several structural, morphological, and bulk properties have been characterized | Several structural, morphological, and bulk properties have been characterized | Several structural, morphological, and bulk properties have been characterized | Several structural, morphological, and bulk properties have been characterized |

Measurements of Autogenic Pressure

Since the formation of smooth carbon spheres and graphitic carbon nanotubes occurs at autogenic pressures created in the reactor during the thermal decomposition of the waste HDPE plastics, knowledge of the pressure at reaction conditions is required. To measure the autogenic pressures, the pressure transducer 20 was attached to a system consisting of a 5 cc stainless steel reactor and a 1 cc stainless steel tube [total volume 6 cc]. During heating of the reactor filled with 1.2 g of polymer waste up to 680° C., the autogenic pressure stays at a pressure of 50 psi. In one embodiment of the invention, 60 to 70% of the volume of the reactor is occupied by the feedstock, prior to treatment, so as to assure that the reactor can withstand the pressure generated at 700° C. It should be noted that it is not necessary to purge the atmosphere with inert gas in order to remove oxygen gas before heating the reactor.

Figure 5:
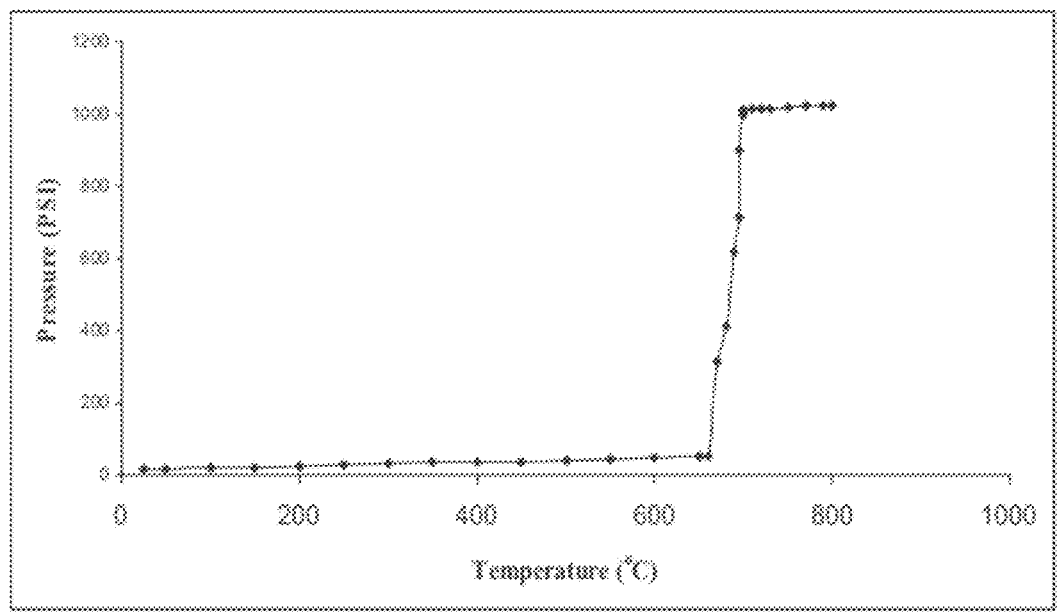
FIG. 5 is a plot of temperature vs. autogenic pressure during the heating cycle used for the decomposition of waste HDPE bags, in accordance with features of the present invention.

At temperatures above 680° C. during the heating cycle, the pressure increases from 50 psi to 1000 psi. This change in pressure is depicted in FIG. 5. This experiment shows that continued heating between 700° C. and 800° C. will not increase the autogenic pressure of the reactor. These pressure measurements were reproducible under similar reaction conditions.

Figure 6:
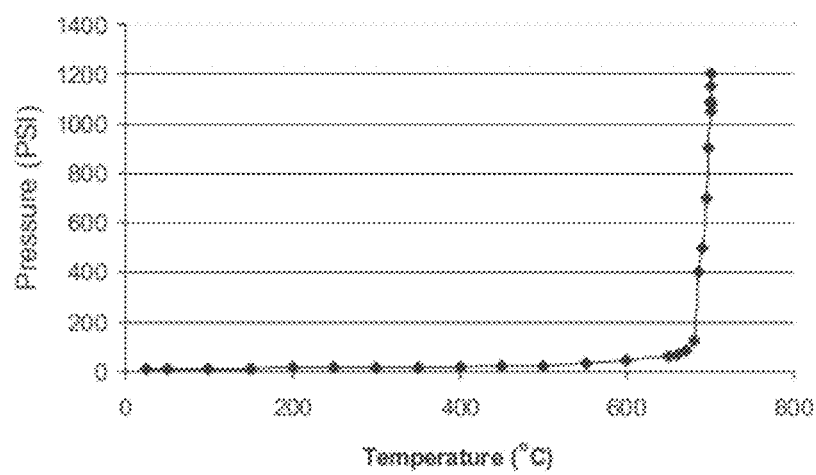
FIG. 6 is a plot of temperature vs. autogenic pressure during the decomposition of waste HDPE bags in the presence of catalyst, in accordance with features of the present invention.

The inventors also observed analogous temperature vs. pressure behavior during the thermal degradation of HDPE in the presence of a $Co(Ac)_2$ catalyst. This similar change in pressure is reproduced in FIG. 6. When the temperature increased to 700° C. the pressure reached 1000 psi as in FIG. 5. However, it continued to increase to a value of 1200 psi during the growth of carbon nanotubes.

The inventors conclude that this excess pressure is due to the decomposition of the catalyst or catalytic cracking. Therefore, the applicant's ascertain that a pressure of 1200 psi is created during the decomposition of polymer waste in a closed system with a volume that is 5 times that of the polymer waste. The amount of pressure which results in the desired morphologies is reproduced in Table 4 below.

TABLE 4

Maximum autogenic pressures as a function of polymer waste at 700° C.

| Experiment number | Polymer waste | Pressure (psi) | Morphology of formed carbonaceous materials |
|---|---|---|---|
| 1 | HDPE | ~1000 | Carbon eggs |
| 2 | LDPE | ~950 | Carbon spheres |
| 3 | HDPE + LDPE | ~1000 | Carbon spheres |
| 4 | HDPE + Co acetate | ~1200 | Carbon nanotubes |

Measurement of Byproducts

A mass spectrometer measured the gases formed during the decomposition of the polymer waste. The whole system was first evacuated prior to the heating cycle to eliminate any potential air contamination.

A 0.5 μm filter was used in the stainless steel tube to prevent the entry of any solid carbon particles into to the mass spectrometer. The mass spectroscopy measurements revealed that the decomposition of polymer waste starts at about 300° C. and the products have equal amounts correlating to water vapor, $CO_2$, and molecules with 2-5 carbon atoms. Analogous mass spectra were obtained up to 600° C. However, at temperatures above 600° C., the inventors recorded smaller amounts of hydrogen/water vapor and larger amounts of hydrocarbons. As the temperature reached 700° C., species with a mass greater than 36 a.m.u. disappeared and only smaller species with 1-3 carbon atoms, along with hydrogen, remained. Therefore, at 700° C., all the C—H and C—C bonds seem to break, thus forming pure solid carbons along with hydrogen gas and a small amount of hydrocarbons. These results are also in good agreement with the pressure measurements, suggesting that the main decomposition of the polymer waste occurs in a temperature range of 600° C. to 700° C.

Hardness Measurements of Carbon Spheres

Surprisingly and unexpectedly, structural investigations revealed that the solid carbon spheres undergo a layer-by-layer assembly of carbon sheets under an autogenic pressure of about 1000 psi.

Figure 7:
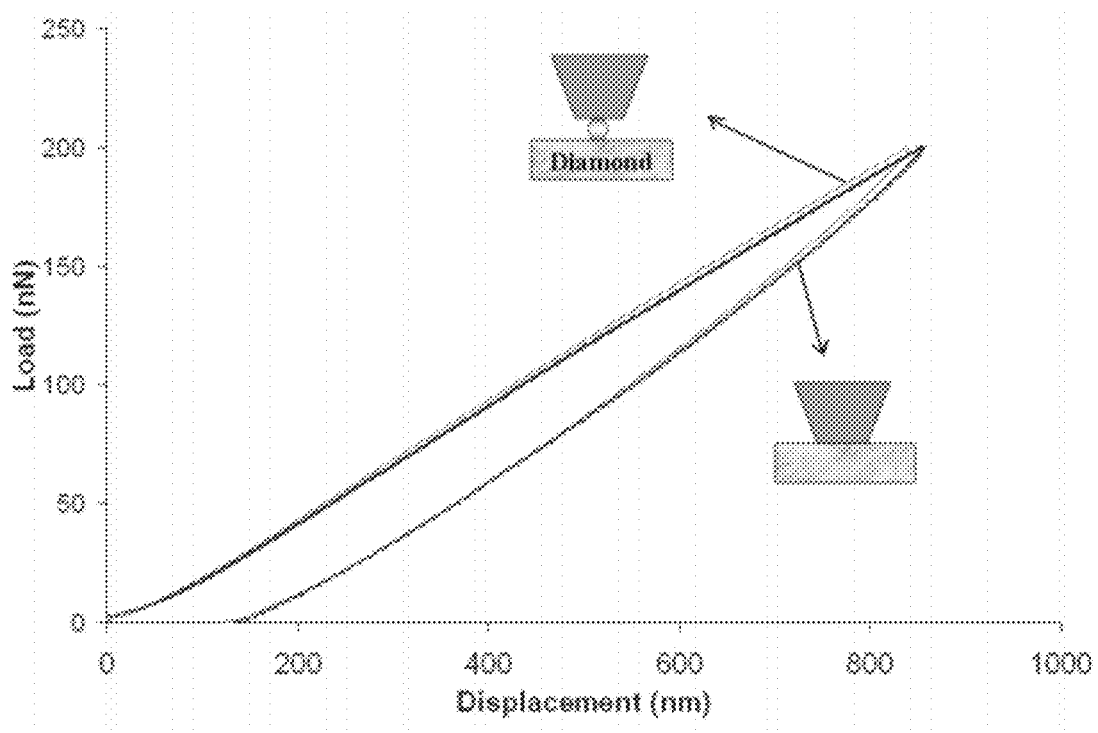
FIG. 7 is a plot of the load-displacement curves for several single carbon spheres, in accordance with features of the present invention.

These spheres were evaluated for their hardness using nanoindentation. In this experiment, a single carbon sphere mounted on a diamond substrate was subjected to an applied force using a diamond indenter. The load-displacement curves that were measured are shown in FIG. 7. The inset shows the geometry used wherein a carbon sphere was mounted on a diamond substrate and load was applied using a diamond nanoindentor. The inventors found that both the carbon sphere and the diamond substrate exhibit similar hysteresis curves, thus implying that the hardness and Young's modulus of carbon spheres are similar to those of diamond [1000 GPa]. Therefore, as a result of these novel properties, these carbon spheres have a wide range of applications including, but not limited to, the tire industry as reinforcement of rubbers, toners, paints, lubricants, harder and light weight tools, and use in the aerospace industry.

Electrical Conductivity

Figure 8A:
FIGS. 8A and 8B are images of the scanning tunneling microscope used to measure the conductivity of carbon spheres by probing the single carbon sphere with two electrodes.
Figure 8B:
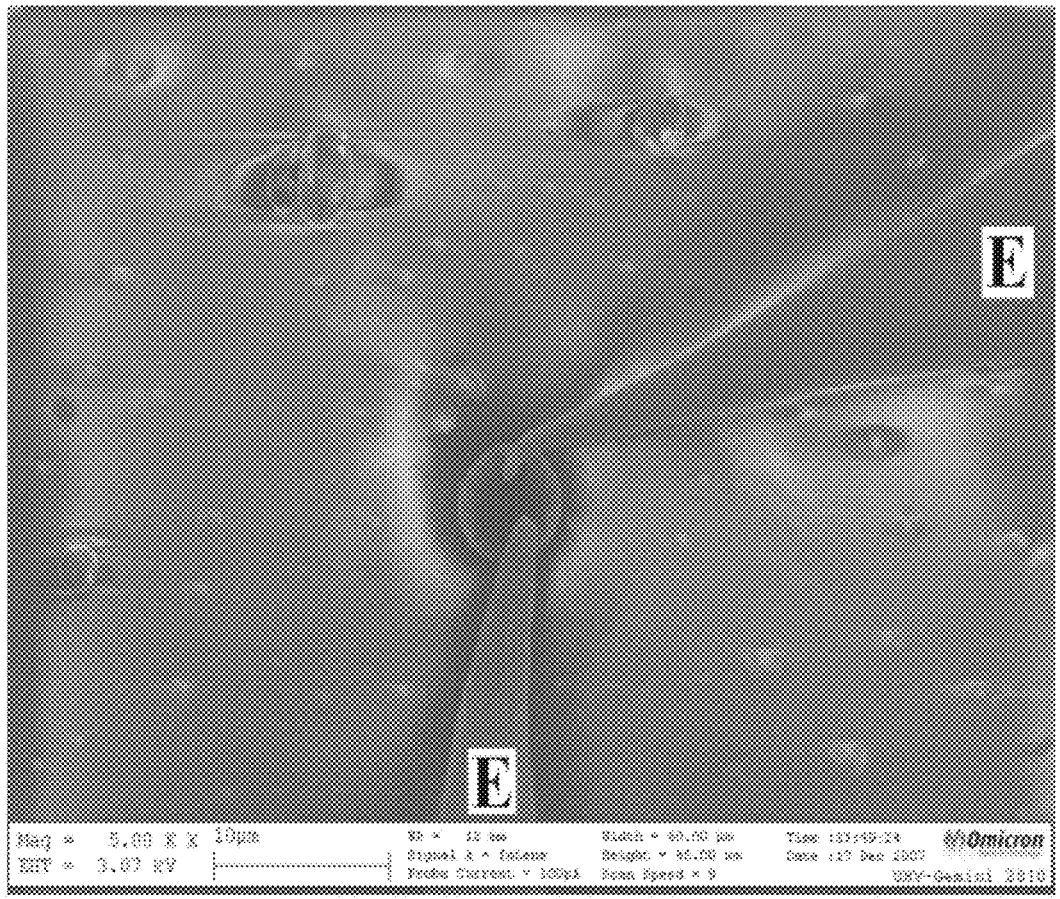

The inventors used a scanning tunneling microscope to measure the electrical conductivity of single carbon spheres. This measuring process is depicted in FIGS. 8A and 8B. The minimum resistance of R=440Ω was measured between two electrodes (designated as "E") attached to carbon spheres. The inventors calculated a conductivity of 45 S/m for a single carbon sphere by considering the area and length between the two probe electrodes attached to the carbon sphere. This high conductivity (compared to 100 S/m) for similarly sized, but unlayered carbon particles, renders the invented multilayered particles valuable in the tire industry (for the dissipation of heat), the paint industry and in the printing/toner industry.

Figure 9:
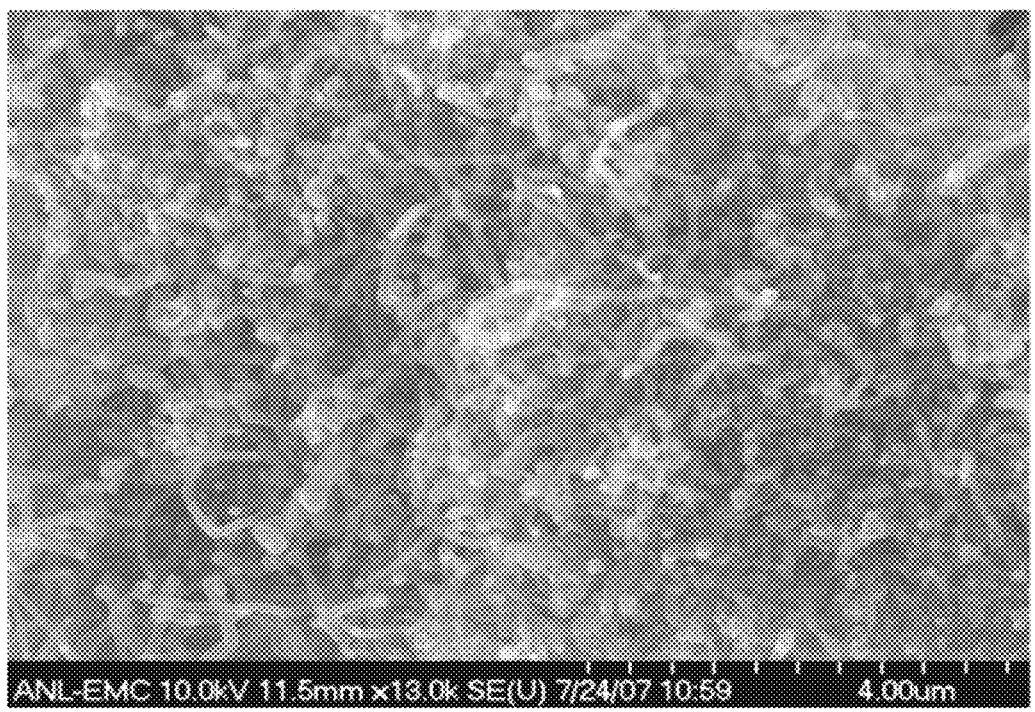
FIG. 9 is a scanning electron micrograph of carbon nanotubes prepared using LDPE in the presence of cobalt acetate catalyst, in accordance with features of the present invention.

FIG. 9 is a scanning electron micrograph of carbon nanotubes prepared from LDPE using cobalt acetate catalyst produced by the invented system.

In summary, the inventors have carried out a number of experiments on the effect of different catalysts, catalyst amount, autogenic pressure and optimum reaction temperature to demonstrate the viability of the invented single step, environmentally friendly process to convert polymer waste into value added uniform carbon spheres and carbon nanotubes. A characteristic of these spheres is that they are formed of a plurality of layers of graphitic carbon.

By using advanced and precise tools, the inventors have measured the novel properties, such as high hardness and electrical conductivity, of the formed carbon spheres. The inventors state that the complete thermal degradation of polymer waste occurs as soon as a temperature of 700° C. is reached and the morphology and macroscopic properties of the formed carbon spheres are identical to those formed at that temperature for an extended period. The information on the measured autogenic pressure created during the thermal decomposition of polymer waste as a function of temperature, the reaction time, and the gas products formed, readily offer the inventors ways to optimize the scaling up of this efficient process for the remediation of polymer waste and the manufacture of valuable carbons.

To scale up this single-step process, the exact pressure created during the thermolysis of polymer waste is determined via thermal degradation of feedstock in a sealed reactor at a temperature of 700° C. Therefore, in order to measure and control the autogenic pressure within the reactor, a pressure transducer is attached to the outside of a system consisting of a 5 cc stainless steel reactor and a 1 cc stainless steel tube furnace. Pressures empirically determined to effect carbon bond breakage in the bench top protocol are directly applicable to scaled up situations.

Ferrocene Catalyst Product

FIGS. 10a-d depicts the formation of multi-walled carbon nanotubes formed in a reactor with ferrocene $Fe(C_5H_5)_2$ catalysts, wherein the nanotube terminates with partially filled iron or ferric core. The iron or ferric fills the core of the nanotube for a few nanometers into the length of the nanotube adjacent to one end of the carbon nanotube. This partially filled nanotube core may be referred to as a metal encapsulated nanotube or a metal tipped nanotube. Like with metal tipped catalyst as formed in FIG. 2C, the use of ferrocene results in an improved length to diameter ratio. The growth of carbon nanotubes is time and temperature dependent. The growth of CNTs is faster in a low oxygen environment with less ferrocene catalyst compare to that observed with a cobalt acetate catalyst. Ferrocene catalyst produces a carbon nanotube having a length to diameter (L/D) ratio of 20:1 to 30:1 over a period of approximately 60 minutes compared to a cobalt acetate based catalyst with an L/D of 15:1 to 20:1 over the same period of time. Like ferrocene, cobaltocene (Co $(C_5H_5)_2$) or nickelocene ($Ni(C_5H_5)_2$) are oxygen free catalysts and are applicable to produce Co and Ni nanoparticles tipped CNTs. In general, metal tipped (Fe, Co, Ni) carbon nanotube provides improved conductivity. However, as the use of ferrocene forms a carbon nanotube with an environmentally compatible conductor. As the decomposition product of the carbon nanotube forms a ferric or ferrous product that is compatible with many biological systems.

It has been reported that ferromagnetic Fe-filled multi-walled carbon nanotubes are used for biomedical application, particularly for drug delivery and hyperthermia (I Mönch, A Leonhardt, A Meye, S Hampel, R Kozhuharova-Koseva, D Elefant, M P Wirth and B Büchner Journal of Physics: Conference Series 61 (2007) 820-824).

As discussed in conjunction with FIG. 4A, ferrocene derived carbon nanotubes form multi-walled nanotubes as illustrated in FIG. 14A-E. As noted hereinabove, the ferrocene-based carbon nanotubes result in a superior L/D ratio, producing a nanotube having a larger L/D ratio. The absence of oxygen in the ferrocene catalyst is believed to assist in maintaining the highly reactive form of metallic catalyst, ultimately growing CNTs with a faster rate.

In an embodiment of the invention, a temperature of 700° C. is sufficient to grow Fe—CNTs using ferrocene as a catalyst with low or high density polyethylenes in these remediation reactions. While in another embodiment of the invention, a temperature of 800° C. was used when oxygen containing cobalt acetate catalyst was used

EXAMPLES WITH FERROCENE CATALYST

Figure 10:
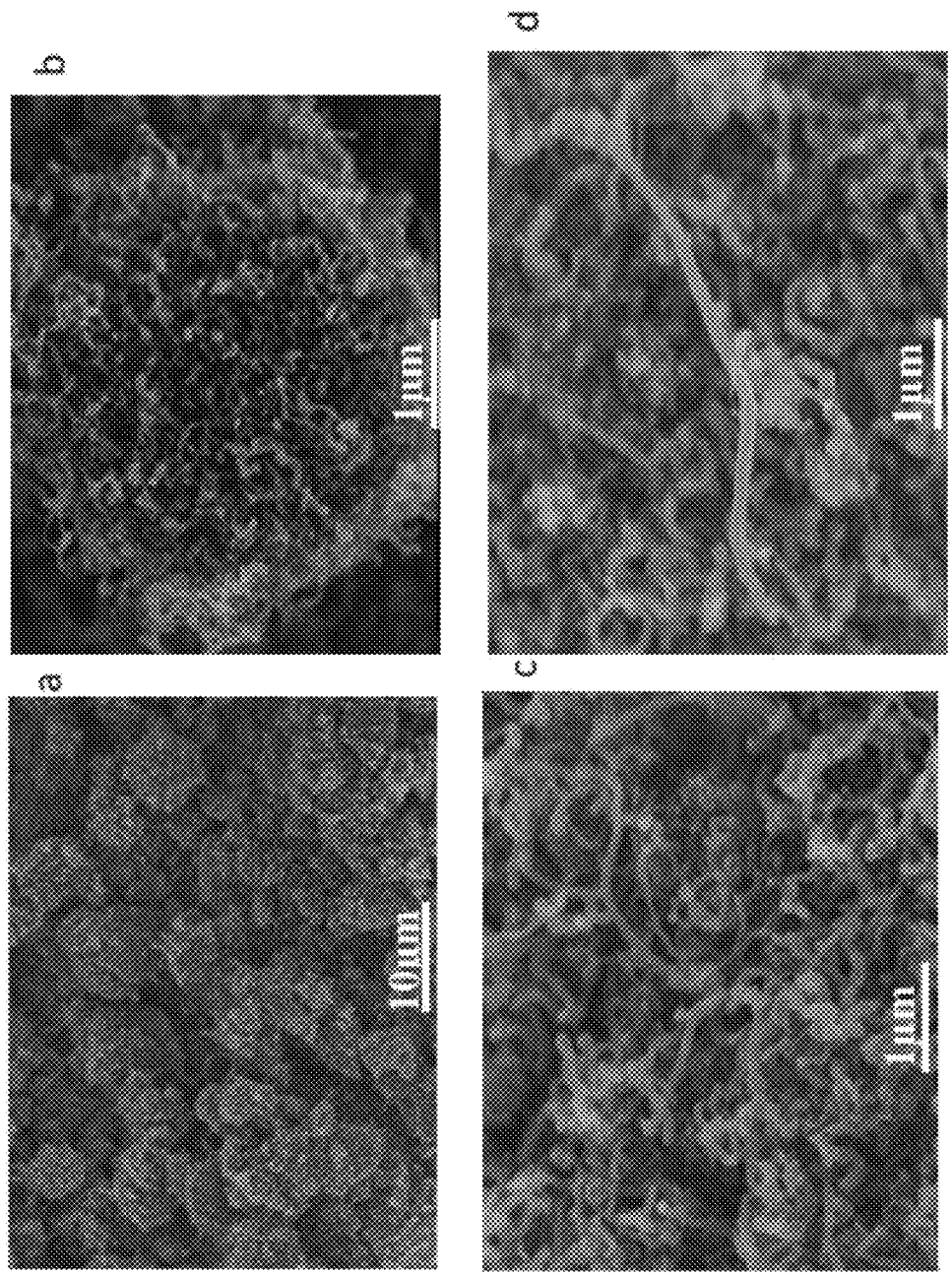
FIG. 10a-d are scanning electron micrographs of carbon nanotubes morphology, which are Fe core terminated catalyst with length more than 2 micrometers and diameters less than 100 nm and were produced with 15% ferrocene catalyst and 85% low density polyethylene, shown at different resolutions (Scale bar lengths in Figure a is 10 μm, and in Figures b-d are 1 μm)
Figure 11:
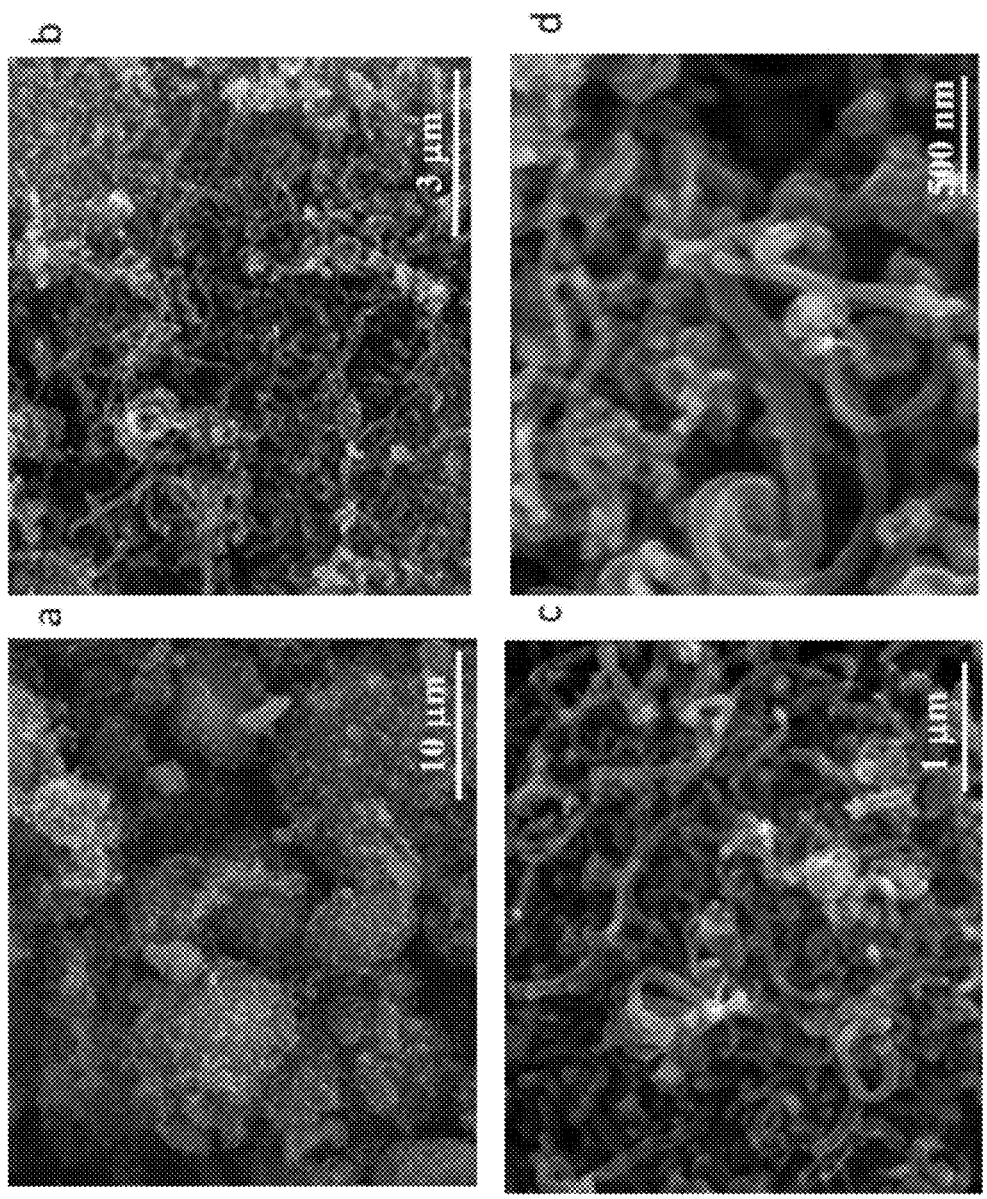
FIG. 11a-d are scanning electron micrographs of carbon nanotubes morphology produced from more than 80% low density polyethylene which was converted to Fe—CNTs, with 20% ferrocene catalyst, taken at different resolutions.

Several runs using the setups described above were executed. The polymer feedstock used in these runs included low density polyethylene (LDPE). Ferrocene $Fe(C_5H_5)_2$ was used as the catalyst at two different levels 15% and 20 wt % ferrocene (provide sample weights, ferrocene weights and pressures). Samples were heated at 700° C. for 120 minutes. Most of the LDPE was converted to carbon nanotubes, of which greater than 90% were converted to Fe-carbon nanotubes (Fe—CNT's). FIG. 10 A-D shows scanning electron micrographs of Fe—CNT's formed with 15 wt % ferrocene and 85 wt % LDPE. FIG. 11 shows scanning electron micrographs of Fe—CNT's formed with 20 wt % ferrocene with 80% LDPE. It is observed that around 20 wt % ferrocene catalyst is appropriate to turn almost all the LDPE into the Fe—CNTs.

Figures 12, 13:
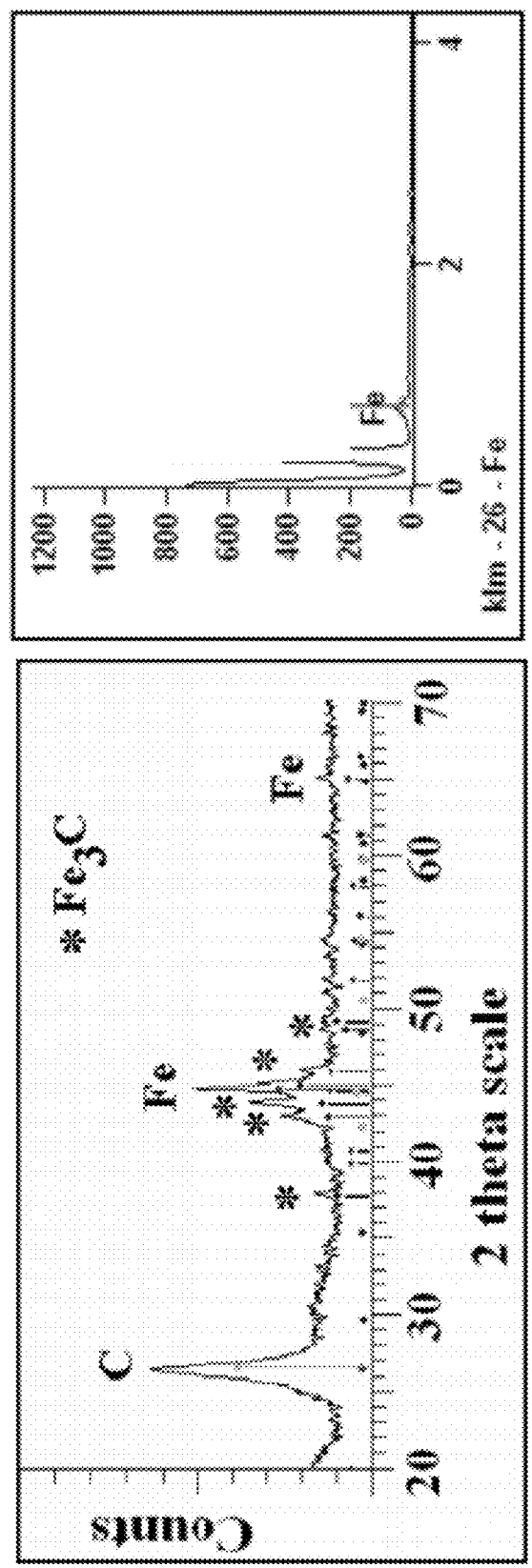
FIG. 12 is an XRD pattern of carbon nanotubes produced with ferrocene catalyst.
FIG. 13 is an EDS pattern of carbon nanotubes produced with ferrocene catalyst.
Figure 14:
FIG. 14A-E are transmission electron micrographs pattern of carbon nanotubes produced with ferrocene catalyst, produced carbon nanotubes are multi-walled, which are tipped with Fe catalyst with length more than several micrometers and diameters in between 50 to 100 nm.
Figure 14:
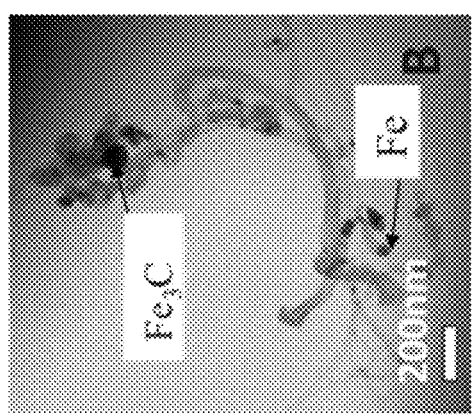
Figure 14:
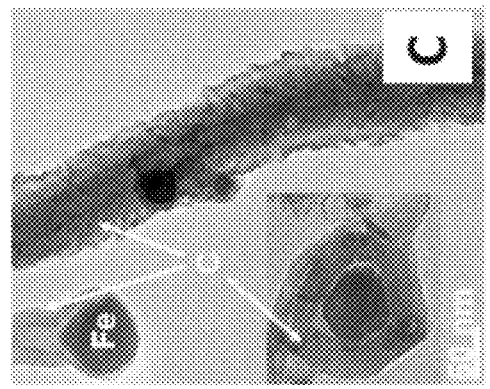
Figure 14:
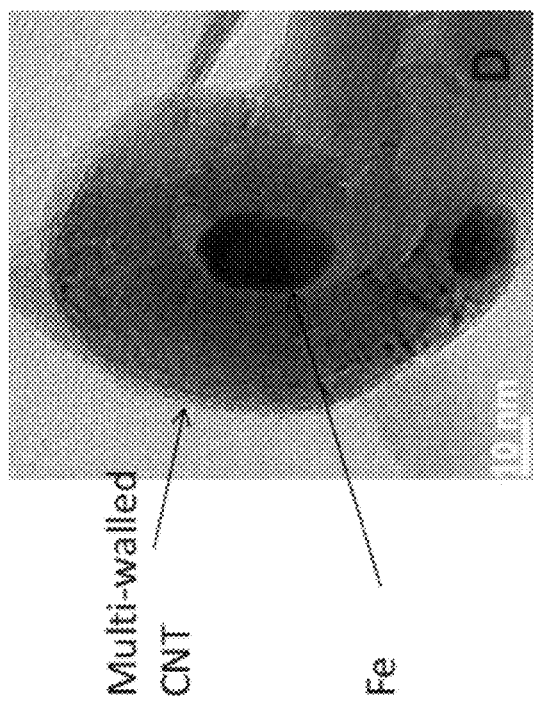
Figure 14:
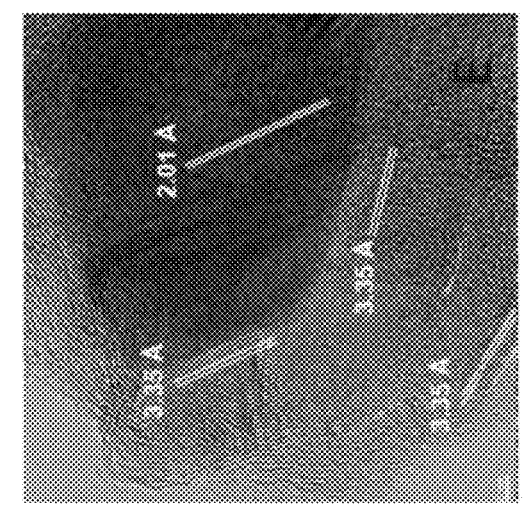
Figure 15:
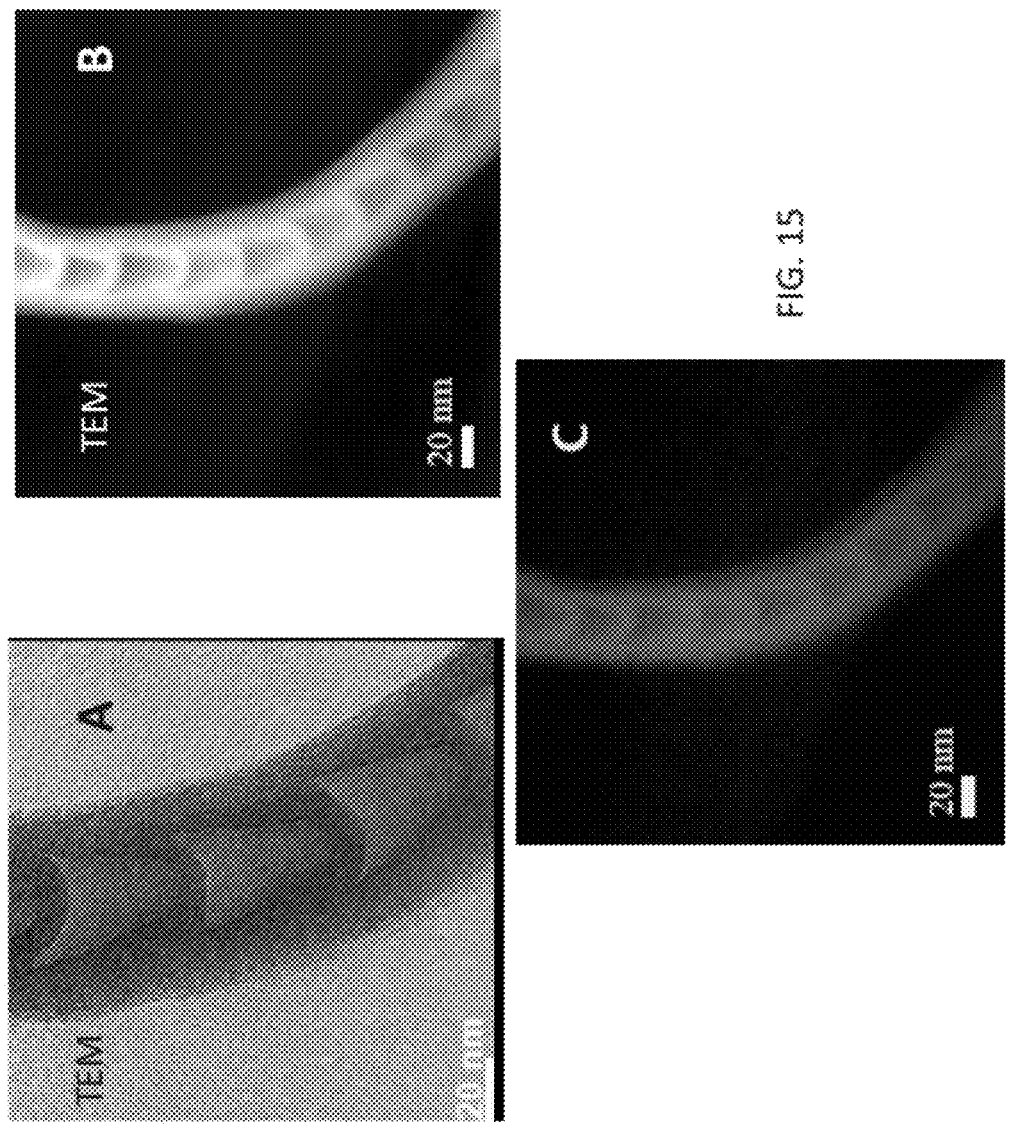
FIGS. 15A and B are transmission electron micrographs and 15C is a electron energy loss elemental analysis of Bamboo shaped carbon nanotubes produced with ferrocene catalyst; some of the carbon nanotubes has bamboo shape as shown in the TEM and their electron energy loss elemental analysis confirmed only presence of carbon and no other impurities in the bamboo shaped CNTs.

As shown in FIG. 12, a powder X-ray diffraction pattern of Fe—CNT detected graphitic carbon, body centered cubic Fe and small portion of Fe3C (iron carbide) in the material. As shown in the energy dispersive X-ray analysis of FIG. 13, Fe—CNT are composed of only Fe and carbon, no other impurities were detected. As shown in the Transmission electron micrographs and electron elemental analysis in FIG. 14A to E. Some (5-10%) of the carbon nanotubes has bamboo shape as shown in the TEM and their electron energy loss elemental analysis confirmed only presence of carbon and no other impurities in the bamboo shaped CNTs (FIG. 15). Bamboo shaped CNT's are thus believed to exhibit improved electrochemical characteristics compared with their straight CNT counterparts with smooth, more basal plane-like regions.

Figure 16:
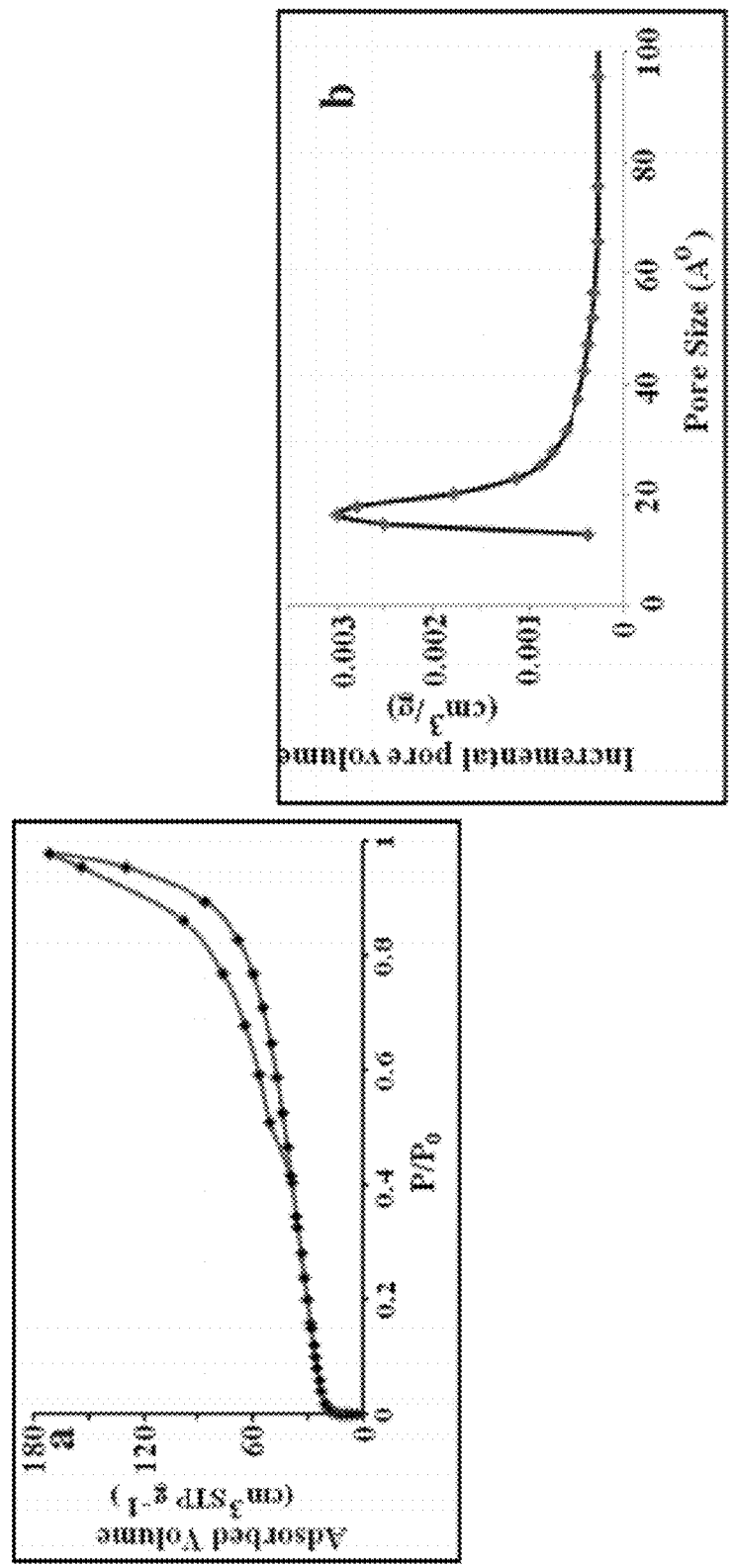
FIG. 16 shows surface area measurements, a) BET surface area and b) Pore Size measurements of carbon nanotubes produced with ferrocene catalyst.

Surface area measurements as measured by BET, FIGS. 16a and b, illustrate high surface area of 108 m2/g and a peak pore size distribution of approximately 20 Å FIG. (16b). Such high surface area of Fe—CNTs are useful for changing the non conducting plastics into conducting polymers with the addition of 1 to 5 wt % Fe—CNTs as an additive.

Figure 17:
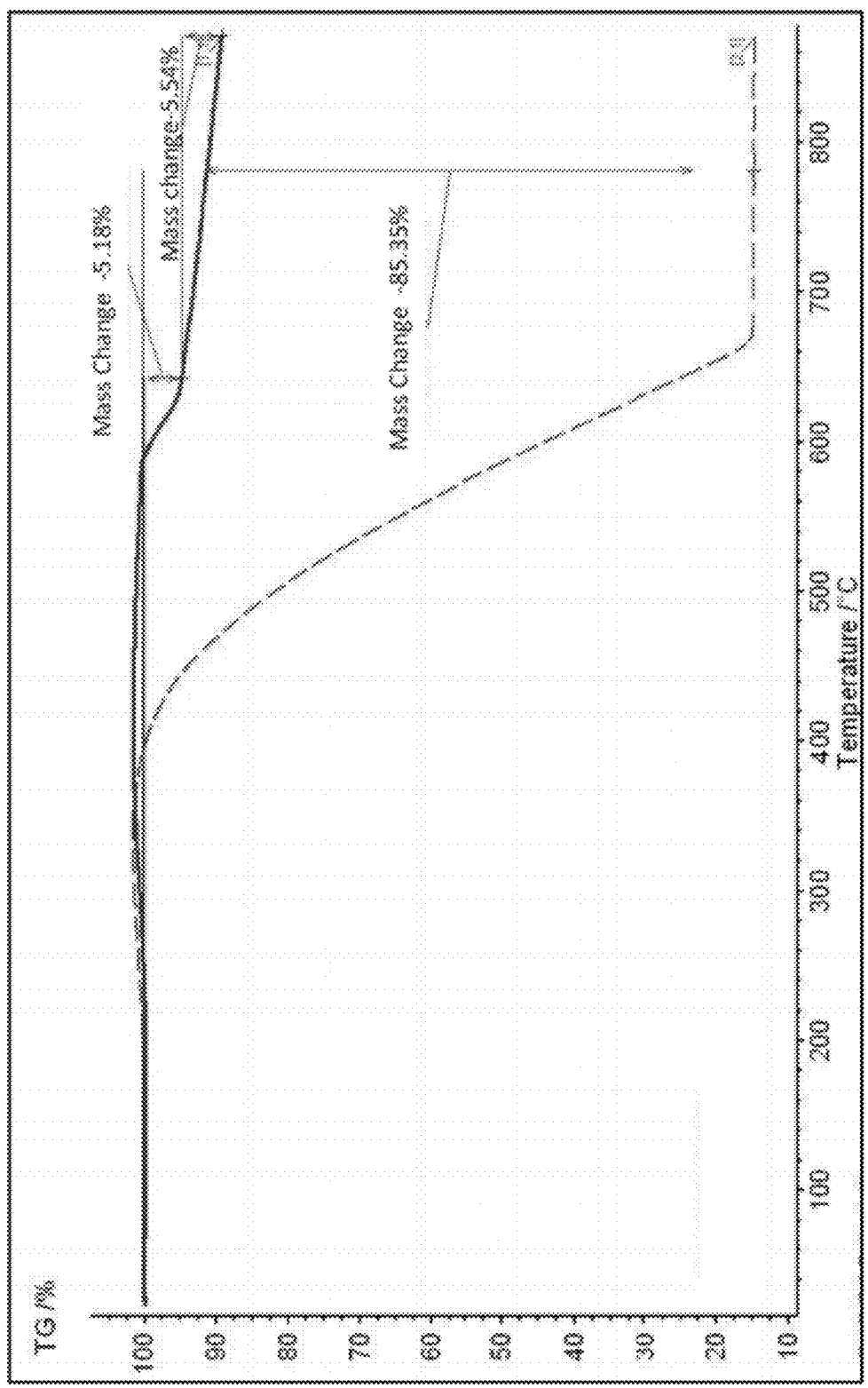
FIG. 17 shows a graph of the Thermal gravimetric analysis of Fe—CNTs in air and in argon atmosphere a) Thermal gravimetric analysis of Fe—CNTs in air measured 85.5% weight loss, b) Thermal gravimetric analysis of Fe—CNTs in inert argon gas measured 10.6% weight loss.

The thermal gravimetric analysis of Fe—CNTs was carried out in an air and in argon atmosphere to understand the changes in the Fe core terminated catalyst. The metallic core fills the nanotube for a short distance (several nanometers) from one end of the nanotube Thermal gravimetric analysis of Fe—CNTs in air measured 85.5% weight loss due to combustion of carbon. Thermal gravimetric analysis of Fe—CNTs in an inert argon gas measured 10.6% weight loss. Thermal gravimetric analysis confirmed that Fe—CNTs are stable up to 400 degree C. in an air or argon atmosphere (FIG. 17). Experimental data confirms the stability of the CNT at processes temperature required in the fabrication of end products, such as tires or component parts.

Figure 18:
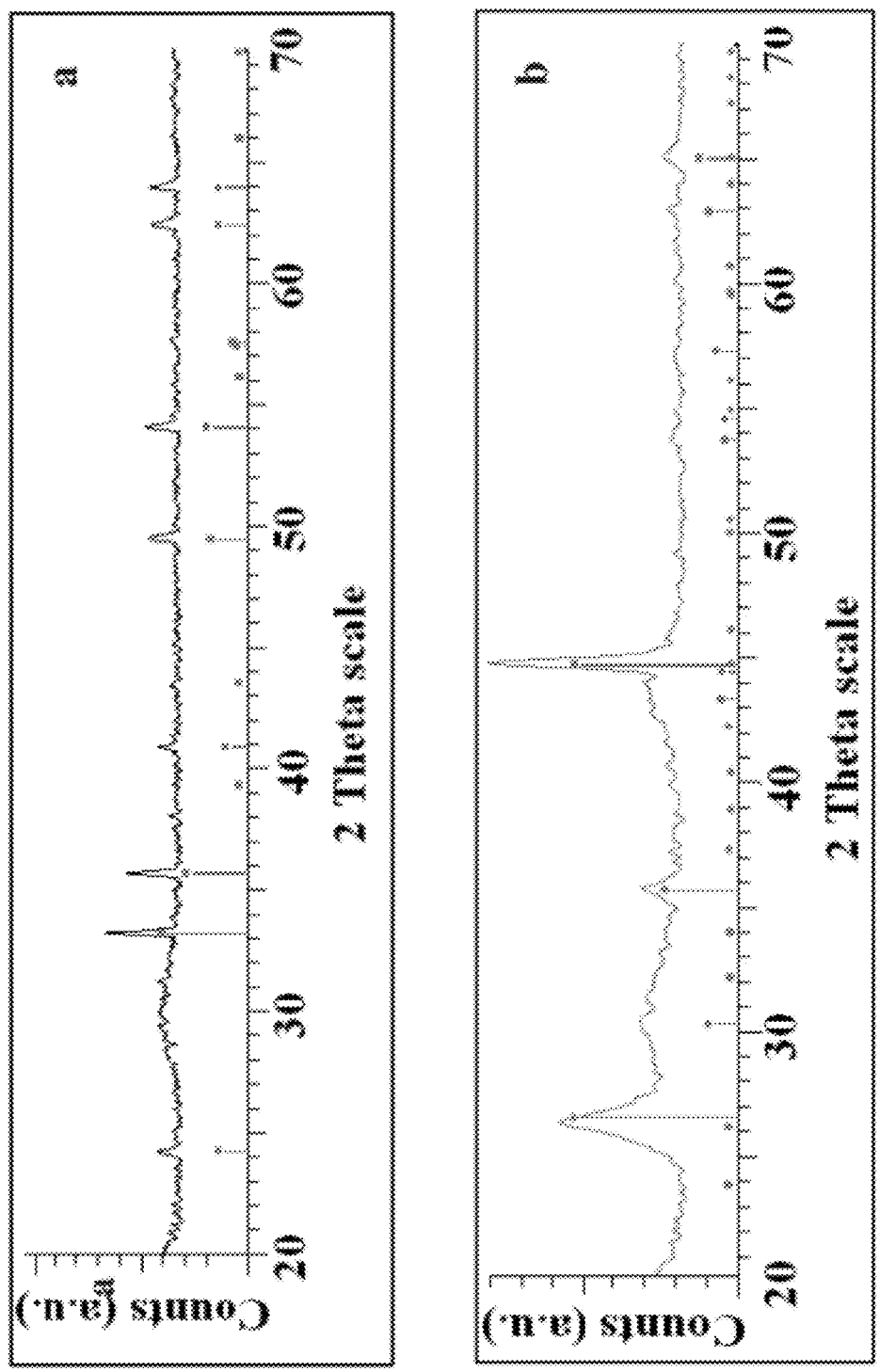
FIG. 18 shows an X-ray diffraction pattern of carbon nanotubes produced with ferrocene catalyst, a) heated in air and b) in argon atmosphere to 900° C.

X-ray diffraction pattern of Fe—CNTs heated in air and in argon atmosphere to 900° C. is presented in FIGS. 18a and 18b. X-ray diffraction pattern of Fe—CNTs heated in air to 900° C. shows rhombohedral structure of Fe2O3 and carbon is completely oxidized. X-ray diffraction pattern of Fe—CNTs heated in argon to 900° C. shows hexagonal graphitic carbon, body centered cubic iron and partially oxidized Fe as cubic Fe2O3. The presence of metallic Fe is an advantage to provide higher conductivity of Fe—CNTs.

Electrical Conductivity of Ferrocene Product

Direct current method was employed to measure the electrical resistance of the Fe—CNT powder. The sample holder container was filled with Fe—CNT powder and pressure was applied on the sample using copper rod to enhance the particle contacts. The copper rod themselves acts as electrical terminals. The Keithley source meter was used to apply the current and measured the resistance. The achieved resistance was converted into electrical conductivity. The measured electrical conductivity of Fe—CNTs powder is 96 S/m.

While the invention has been described with reference to details of the illustrated embodiment, these details are not intended to limit the scope of the invention as defined in the claims.

The embodiment of the invention in which an exclusive property or privilege is claimed is defined as follows:

1. An isochoric process of transforming polymer forms into carbonaceous particles, comprising:
    a) heating the polymer forms in an autogenic pressure chamber which contains any increase in pressure during the process;
    b) maintaining the polymer forms at a temperature and for a time sufficient to cause substantially all C—H and C—C bonds in the forms to break; and
    c) cooling the environment, wherein the chamber contains transition metal compounds and the carbonaceous particles are comprised of multi-walled nanotubes encircling the metal compounds.

2. The process of claim 1 wherein the polymer forms are solids selected from the group consisting of polyethylene, polystyrene, block copolymer, and combinations thereof.

3. The process of claim 1 wherein the chamber is a closed, fixed volume reactor.

4. The process of claim 1 wherein the transition metal compounds contain elements selected from the group consisting of Ni, Co, Fe, and combinations thereof.

5. The process recited in claim 1 wherein the transition metal compounds are catalysts selected from the group consisting of cobaltocene, nickelocene and ferrocene.

6. The process recited in claim 5 wherein the catalyst is ferrocene.

7. The process of claim 1 wherein the temperature is between approximately 600 and 900° C.

8. The process recited in claim 1 wherein the chamber contains a nonoxidizing or reducing environment.

9. The process recited in claim 1 wherein the chamber contains moieties selected from the group consisting of nitrogen, carbon dioxide, argon, helium, neon, sulfur dioxide, or combinations thereof.

10. The process recited in claim 1 wherein the multi-walled nanotube is a bamboo shaped carbon nanotube.

11. The process of claim 1 wherein the multi-walled carbon nanotube has a metal core adjacent to one end of the nanotube.

12. The process as recited in claim 1 wherein the transition metal is homogeneously mixed with the polymer forms.

13. The process as recited in claim 1 wherein the pressure is not released until the reactor is allowed to cool to ambient temperature.

14. An isochoric process of transforming polymer forms into carbon nanotubes, comprising:
    forming a carbon nanotube having a metal core adjacent to one end by
    a) heating the polymer forms in an autogenic pressure chamber which contains any increase in pressure during the process;
    b) maintaining the polymer forms at a temperature and for a time sufficient to cause substantially all C—H and C—C bonds in the forms to break;
    c) cooling the chamber, wherein the chamber contains transition metal compounds and carbonaceous particles are comprised of multi-walled carbon nanotubes encircling a metal core adjacent to one end of the nanotube; and
    d) releasing the pressure after the reactor is allowed to cool.

15. The process as recited in claim 14 wherein the transition metal is homogeneously mixed with the polymer forms.

16. A batch process for producing carbonaceous particles, the process comprising:
    a) placing polymer forms in an isochoric chamber which contains any increase in pressure produced inside the chamber;
    b) heating the forms in the chamber;
    c) maintaining the chamber at a temperature and for a time sufficient to cause C—H and C—C bonds in the forms to break; and
    d) cooling the chamber, wherein the chamber contains transition metal compounds and the carbonaceous particles are comprised of multi-walled nanotubes encircling the compounds.

17. The batch process of claim 16 wherein the polymer forms are solids selected from the group consisting of high and low density polyethylene and polystyrene waste, block copolymer, and combinations thereof.

18. The batch process of claim of claim 16 wherein the chamber is a closed, fixed volume reactor.

19. The batch process of claim 18 wherein the catalyst is ferrocene.

20. The batch process of claim 16 wherein the chamber is maintained at a temperature between approximately 600 and 900° C.

21. The batch process of claim 16 wherein the chamber is nonoxidizing or reducing.

22. The batch process of claim 16 wherein the chamber contains inert fluids selected from the group consisting of helium, argon, neon, nitrogen, argon, and combinations thereof.

23. The batch process of claim 16 wherein the multi-walled nanotube is a bamboo shaped carbon nanotube.

24. The process as recited in claim 16 wherein the transition metal is homogenously mixed with the polymer forms.

* * * * *